United States Patent
Fatemi-Ghomi et al.

(10) Patent No.: US 7,974,262 B2
(45) Date of Patent: Jul. 5, 2011

(54) SAMPLE ACQUISITION TIMING ADJUSTMENT

(75) Inventors: Navid Fatemi-Ghomi, Surrey (GB); Cyril Valadon, Hertfordshire (GB)

(73) Assignees: MStar Semiconductor, Inc. (KY); MStar Software R&D, Ltd., Shenzhen (CN); MStar France SAS, Issy les Moulineaux (FR); MStar Semiconductor, Inc. (TW)

( * ) Notice: Subject to any disclaimer, the term of this patent is extended or adjusted under 35 U.S.C. 154(b) by 1178 days.

(21) Appl. No.: 11/659,600

(22) PCT Filed: Aug. 5, 2005

(86) PCT No.: PCT/GB2005/003111
§ 371 (c)(1),
(2), (4) Date: Feb. 7, 2007

(87) PCT Pub. No.: WO2006/016140
PCT Pub. Date: Feb. 16, 2006

(65) Prior Publication Data
US 2007/0297372 A1 Dec. 27, 2007

(30) Foreign Application Priority Data
Aug. 13, 2004 (GB) .................................. 0418133.5

(51) Int. Cl.
*H04J 3/06* (2006.01)
(52) U.S. Cl. .......................... 370/350; 370/337; 375/148
(58) Field of Classification Search .................. 370/337; 375/148
See application file for complete search history.

(56) References Cited

U.S. PATENT DOCUMENTS

| 5,764,102 A | 6/1998 | Cochran et al. |
| 6,693,983 B1 | 2/2004 | Moher et al. |
| 2003/0026326 A1* | 2/2003 | Jayaraman et al. ........... 375/148 |
| 2003/0186666 A1* | 10/2003 | Sindhushayana ............. 455/260 |

FOREIGN PATENT DOCUMENTS

| EP | 0 627 830 A1 | 12/1994 |
| EP | 0 741 472 A2 | 11/1996 |
| EP | 0 793 365 A2 | 9/1997 |
| EP | 0 926 857 A2 | 6/1999 |
| WO | WO 2004/032407 A1 | 4/2004 |

OTHER PUBLICATIONS

Makundi, et al., "Generalized Symbol Synchronization Using Variable IIR and FIR Fractional-Delay Filters With Arbitrary Oversampling Ratios", ICASSP 2004, IEEE, vol. 2, pp. 405-408, (May 17, 2004).
Makundi, et al., "Closed-Form Design of Tunable Fractional-Delay Allpass Filter Structures", ISCAS 2001, IEEE, vol. 4, pp. 434-437, (May 6, 2001).
Makundi, et al., "Efficient Symbol Synchronization Techniques Using Variable FIR or IIR Interpolation Filters", Proc. 2003 IEEE, International Symposium on Circuits and Systems, vol. 3, pp. 570-573, (2003).

* cited by examiner

*Primary Examiner* — Charles Shedrick
(74) *Attorney, Agent, or Firm* — Edell, Shapiro & Finnan, LLC

(57) ABSTRACT

A telecommunications network participant, comprising means for digitising, as a series of samples, a received signal containing a succession of symbols, means for measuring time misalignment between the symbols and the samples and means for applying a fractional delay to the positions of the samples to reduce the misalignment.

12 Claims, 5 Drawing Sheets

SAMPLE ACQUISITION TIMING ADJUSTMENT

CROSS REFERENCE TO RELATED APPLICATIONS

This application is an national phase application based on PCT/GB2005/003111, filed Aug. 5, 2005, and claims the right to priority based on Great Britain Application No. 0418133.5, filed Aug. 13, 2004, the content both of which is incorporated herein by reference.

The proposed invention describes a mechanism for achieving time synchronism between a transmitter and a receiver in Time Division Multiple Access (TDMA) communication systems.

FIG. 1 illustrates a mobile telephone 100 that communicates with a base station (not shown) using a time division multiplex (TDM) scheme such that bursts containing series of digital symbols are periodically exchanged between the telephone and the base station. FIG. 1 illustrates the mobile telephone 100 from the standpoint of its function as a receiver. FIG. 1 illustrates certain major processes that are involved in the processing of received signals and the skilled person will realise that some processes have been omitted for the sakes of clarity and brevity. It will be understood by a person skilled in the art that whilst FIG. 1 illustrates a chain of processing activities, FIG. 1 does not necessarily reflect how these processes would be implemented in a practical device. Usually, the processes shown in FIG. 1 would be implemented as a mixture of hardware and software entities.

A signal burst received at the antenna 109 of the telephone 100 from the base station is first processed by the Radio-Frequency (RF) unit 101 to produce an analogue electrical signal which is passed to a mixed-signal processing unit 102 for conversion to a digital format. The mixed signal processing unit 102 performs analogue to digital conversion (ADC) of the analogue signal at 103, followed by digital low pass filtering at 104 and then decimation at 105. The decimated signal is then passed to a digital signal processing block 106. The processing performed by block 106 includes demodulation at 107 to produce estimates of the transmitted information bits. The estimated information bits are then put to their intended purpose, typically the reconstruction of speech.

The purpose of the decimation process 105 is to reduce the number of samples per second which are provided to the digital signal processing unit 106. This rate reduction is defined by a decimation factor D. The decimation process 105 outputs one sample for every D samples from the low-pass filtering process 104. The sampling phase of the decimation process 105 is the position, within a group of D samples that are to be decimated, of the sample that is to survive the decimation process and be provided as an output. Due to implementation complexity issues, the sampling phase in the mixed-signal processing unit 102 is usually fixed.

In addition to producing estimates of transmitted information bits, the digital signal processing block 106 also generates estimates of a timing error indicating any mismatch between the sampling instants used by the ADC unit 103 and the boundaries of information symbols in the current burst from the transmitter. The timing error estimates are then used to correct the timing of the sampling instants that are used by the ADC unit 103 in the digitisation of the next burst to be received from the transmitter. Averaging or filtering of the timing error estimates is performed by process 108 prior to their use in adjusting the sample acquisition timing of the ADC unit 103. This filtering stage 108 improves the accuracy of the corrections that are made to the sample acquisition timing of the ADC unit 103. The loop through filtering stage 108 is known as the timing recovery loop.

The approach described above imposes two constraints on the performance of the timing-recovery loop. First, the timing resolution of the samples processed by the digital signal processing block 106 is set by the frequency at which the mixed-signal processing unit 102 operates (i.e. the frequency at which ADC unit 103 produces digital samples) and the decimation factor D used by process 105. If, in order for the telephone to demodulate received bursts satisfactorily, a better timing resolution is required by the digital signal processing section 106, either the decimation factor needs to be reduced or the operating rate of the mixed-signal unit 102 needs to be increased. Either of these options will increase the power consumption of the mixed-signal processing section 102 and will also increase the memory required by the digital signal processing block 106 to store the digital samples arriving from the mixed-signal processing stage 102. Second, once the mixed-signal unit 102 starts generating samples, the period between consecutive samples is effectively constant. This is due to the fact that usually it is not possible to satisfactorily change the sampling phase of the decimation process 105 while receiving samples from the upstream processes 103 and 104. These limitations may lead to receiver performance degradation in a number of circumstances. Two such scenarios will now be described.

In the E-GPRS (Enhanced General Packet Radio Service) system, the information is transmitted in bursts, also referred to as slots, of a fixed size. A burst is defined to contain 156¼ symbols ('3GPP TS 05.02, $3^{rd}$ Generation Partnership Project, Technical Specification Group GSM/EDGE; Radio Access Network; Multiplexing and multiple access on the radio path'). Hence, when multi-slot transmission is used to achieve high throughput, the receiver timing will slip by an extra quarter symbol for each slot following the first one. The 8 PSK modulation, which is used in the E-GPRS system, is very sensitive to timing errors, even when the timing error is sub-symbol. Hence, if this quarter symbol slip is not corrected at a receiver, transmission link quality will degrade and link throughput will be reduced. One potential way to correct this quarter symbol slip is to change the sampling phase of the decimation process 105 between the different slots. However, this usually is not possible without having to completely refresh the contents of the preceding low-pass filtering process 104 and such a refresh event will result in the loss of a few symbols of the received burst thus degrading receiver performance. Hence, the approach described in FIG. 1 for the receiver timing recovery loop will not perform very well for the E-GPRS system.

Another possible scenario where the timing recovery loop of FIG. 1 may not provide adequate performance is when constraints are set on when the timing of a receiver can be changed. For example, in order to reduce the implementation complexity, it is possible for a receiver to use the same timing reference for both uplink and downlink timing. In this case, transmission timings and reception timings are derived from a single master timing event. In cellular communication systems, limits can be imposed by a network as to when uplink timing can be changed. For example, in the E-GPRS system, uplink timing can only be changed if a timing error greater than half the duration of one symbol is present. If uplink and downlink timings are locked, this restriction on uplink timing changes can result in a downlink timing error of up to the duration of half a symbol. Such a residual error can degrade the performance of the demodulation process 107 and will reduce communications link throughput. One possible way to address these drawbacks discussed above is shown in FIG. 2.

The approach used in FIG. 2 is similar to the that used in FIG. 1 and elements 201 to 205, 208 and 209 of FIG. 2 correspond, respectively, to elements 102 to 108 in FIG. 1 and their function will not be described in detail again. However, two new processes 206 and 208 have been added to the digital signal processing stage 205. The signal from the mixed-signal processing unit 201 goes first through a low-pass filtering process 206 and is then decimated using process 207 before being demodulated at 208. Any potential frequency aliasing that could be introduced by the decimation process 207 is removed by the low-pass filtering process 206.

The minimum sampling rate at the output of the mixed-signal stage 201 needs to be set to meet the timing resolution required by the digital signal processing stage 205. This means that the sampling rate at the output of the mixed-signal processing unit will usually be significantly higher than the information data rate. The higher sampling rate at the input to the digital signal processing block 205 makes it possible for the receiver to adjust the timing of the received signal by selecting different sampling phases in the decimation process 207. The decision on the sampling phase to be used in the decimation process can be derived from different sources. It can for example be based on the estimates of the residual timing error. This overall approach leads to a timing recovery loop with a potentially very fine time resolution. However, there are two major obstacles to the implementation of the solution shown in FIG. 2. First, to obtain the fine time resolution, the mixed-signal processing unit needs to be operated at clock rates significantly larger than the information date rate. This will have associated costs in terms of silicon die size and/or power consumption. Second, because the sampling rate at the input of the digital signal processing will be higher than the information rate, larger buffers will be required to store the receiver samples. This will have a deleterious impact on the overall memory requirements of the receiver.

The present invention aims to provide an alternative timing recovery loop for control of receiver timing.

According to one aspect, the invention provides a telecommunications network participant, comprising means for digitising, as a series of samples, a received signal containing a succession of symbols, means for measuring time misalignment between the symbols and the samples and means for applying a fractional delay to the positions of the samples to reduce the misalignment.

The invention also consists in a method of digitising a received telecommunications signal, the method comprising digitising, as a series of samples, a received signal containing a succession of symbols, measuring time misalignment between the symbols and the samples and applying a fractional delay to the positions of the samples to reduce the misalignment.

The invention may permit a fine timing resolution to be achieved without the necessity of a high sampling rate. In turn, this may lead to a reduction in power consumption and memory requirements.

In certain embodiments, the timing of the digitisation of the samples is adjusted to suppress the misalignment.

In certain embodiments, the samples are shifted in time, either forwards or backwards, by one or more integer symbol positions to suppress the misalignment. For example, by applying an integer sample shift of +1 sample positions and a fractional delay of ¾ of a symbol position, a net misalignment of +¼ sample positions can be corrected.

In certain embodiments, the received signal has a format such that the symbols are arranged in bursts, a respective timing error is deduced for each of one or more bursts and a fractional delay is applied to the positions of the samples to suppress the timing error or errors.

In certain embodiments, the received signal has a format such that the symbols are arranged in bursts, a timing error is deduced for each of several bursts and the errors are combined to produce a resultant error and a fractional delay is applied to the positions of the samples to suppress the resultant error.

In certain embodiments, the received signal has a format in which the bursts are grouped into a repeated time frame, the time frame containing a number of time slots, each time slot containing a burst and, for each of a plurality of said time slots, a timing error is deduced for each of one or more bursts in the respective slot and a fractional delay is applied to the positions of the samples to suppress the timing error or errors of the respective slot.

In certain embodiments, the received signal has a format in which the bursts are grouped into a repeated time frame, the time frame containing a number of time slots, each time slot containing a burst and, for each of a plurality of said time slots, a timing error is deduced for each of several bursts and timing errors of the respective slot are combined into a resultant error for the respective slot and a fractional delay is applied to the positions of the samples to suppress the resultant error of the respective slot.

In certain embodiments, timing errors from different time slots are combined to produce a sampling timing error and the timing of the digitisation of the samples is adjusted to suppress the sampling timing error.

In certain embodiments, a timing error for a burst is deduced by calculating the position of a known training sequence in the burst and measuring the time offset between said position and an ideal position in the burst of said training sequence.

In certain embodiments, a desired fractional delay is applied to samples by appropriately reconfiguring a fractional delay filter providing the delay. Several pre-stored configurations of the filter may be provided such that the filter can be reconfigured by selecting for the filter the configuration that most closely matches the desired fractional delay.

In certain embodiments, the digitisation of the signal takes place at substantially the same rate as the information modulation rate of the received signal.

The invention is applicable to various communication systems and is particularly well suited to the E-GPRS system.

The invention can be realised in hardware, in software on a processor, or a combination thereof.

The invention can be utilised in, for example, a base station or a mobile telephone. By way of example only, certain embodiments of the invention will now be described with reference to the accompanying Figures, in which.

Figure 3:
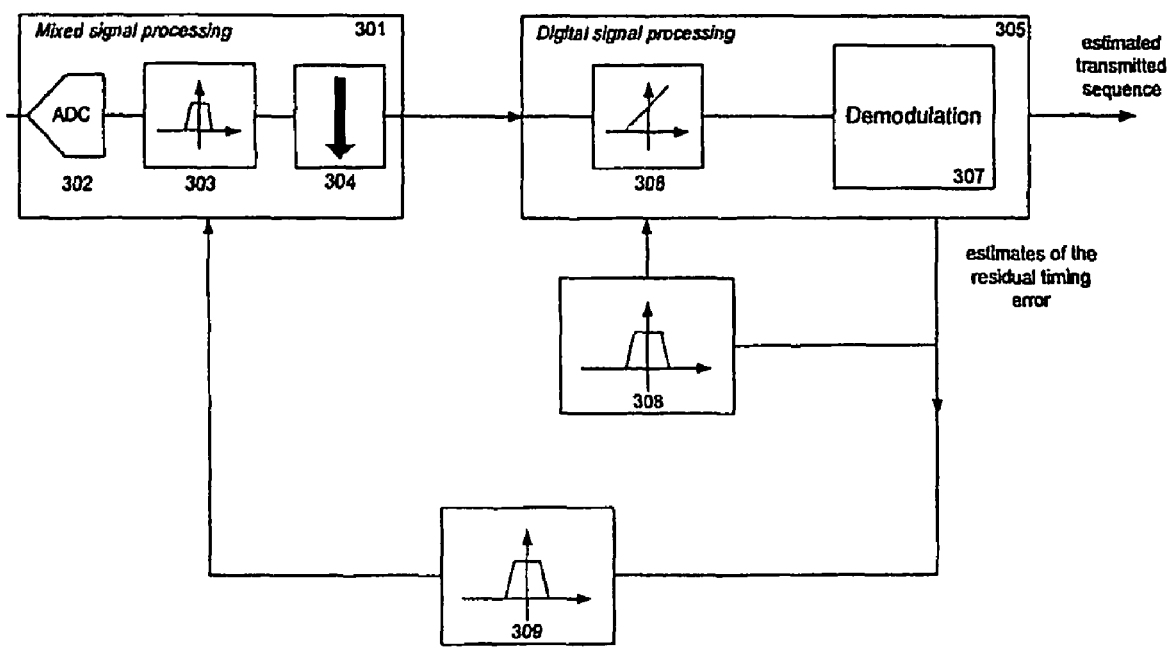
Figure 4:
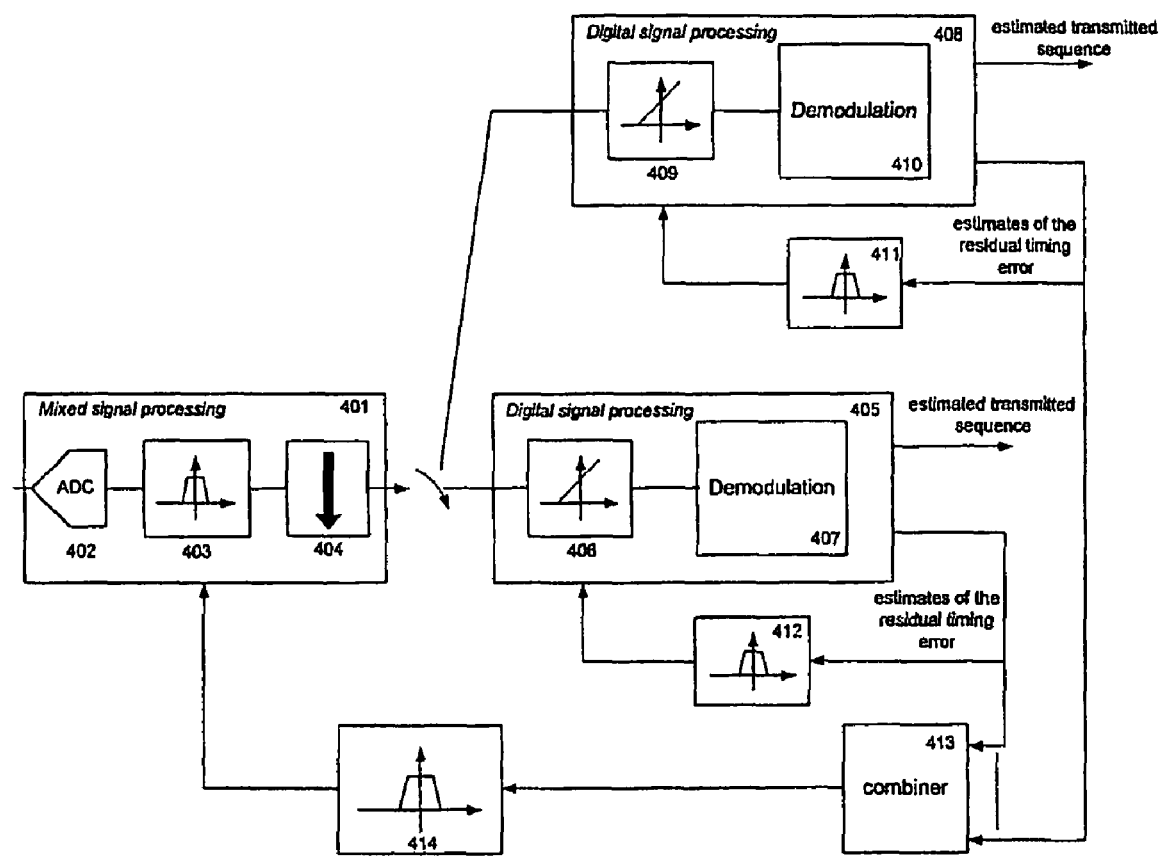
Figure 5:
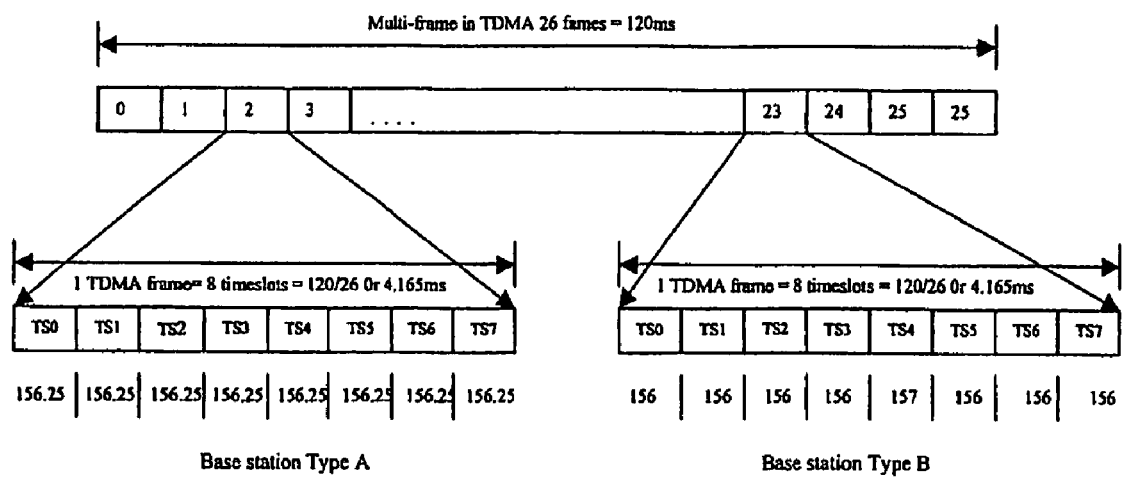

FIG. 3 presents a timing loop according to the present invention;

FIG. 4 illustrates another embodiment of a timing loop according to the present invention: and FIG. 5 shows the two alternative formats for information bursts transmitted by a GSM/GPRS/E-GPRS base-station.

Figure 1:
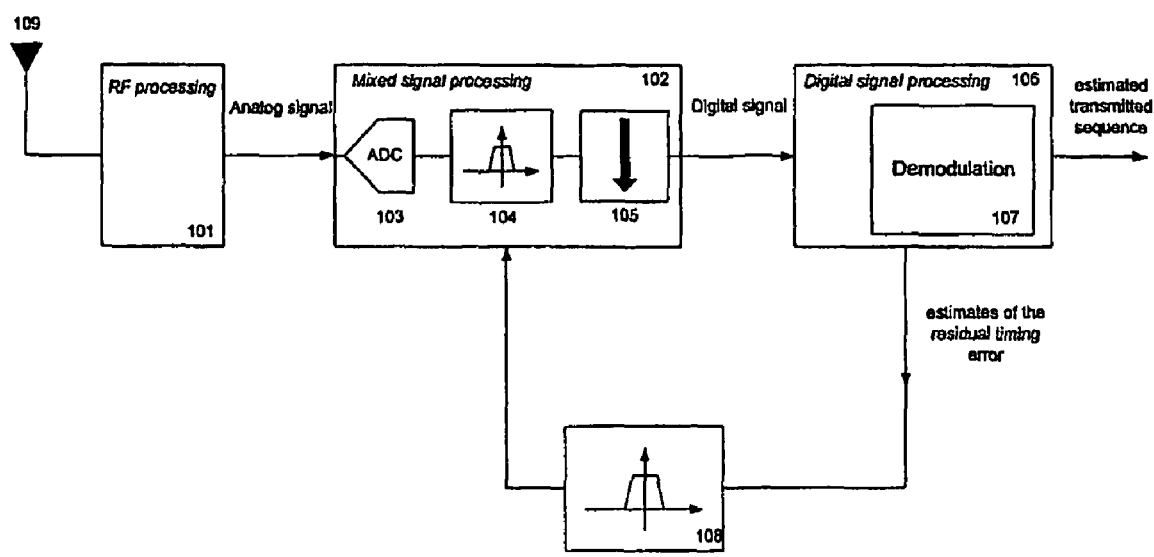
FIG. 1 shows a conventional mobile telephone, focussing on aspects of related to its timing recovery loop.
Figure 2:
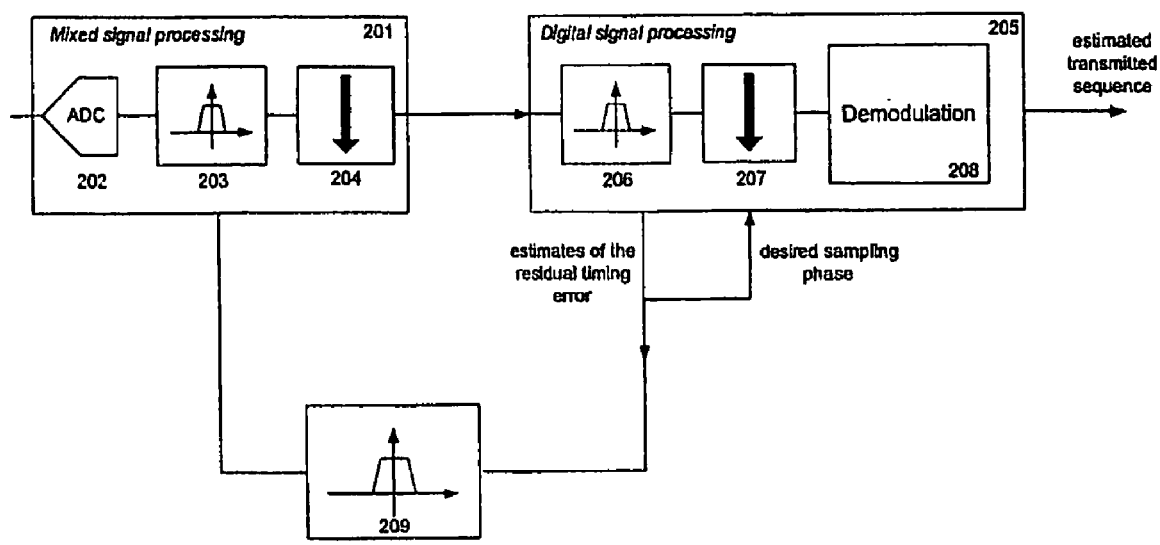
FIG. 2 shows a potential modification that could be made to the timing recovery loop of FIG. 1 to improve the time resolution of the loop.

FIG. 3 illustrates an adaptation of the timing recovery loop described earlier with reference to FIG. 1. Elements 301 to 304, 305 and 307 correspond, respectively, to elements 102 to 107 of FIG. 1 and their functions will not be described again in detail. Whereas in FIG. 2 the sampling rate at the output of the mixed-signal processing stage is set to provide the timing resolution required by the digital signal processing block 305, the sampling rate at the output of the mixed-signal unit 301 is set merely to the rate required by the demodulation process 307 in the absence of any timing error. This will be typically of the same order as the information data rate. By keeping the sampling rate at the output of the mixed-signal unit 301 to a low value, power consumption and memory requirements are reduced. However, this approach means that a residual timing error can be present in the signal input to the digital signal processing block 305. This error is removed by fractional delay process 306 which acts on the signal en route to the demodulation process 307.

In this embodiment, the fractional delay process 306 implements a fractional delay filter. Such filters are designed to have a flat amplitude response and a linear phase response across the bandwidth of the input signal. Hence, information passing through process 306 is not modified but simply delayed. By selecting the slope of the linear phase response a delay of any given value can be applied to the sampling points. The operation of process 306 can be regarded as equivalent to that of a perfect interpolator (as long as the sampling rate satisfies the Nyquist criterion). Of specific interest to the proposed invention is the fact that the delay introduced by the fractional delay process can be lower than the period of the samples at the output of the mixed-signal processing unit. Hence, the fractional delay process 306 can implement a fraction-delay filter to correct any residual timing error in the signal supplied by the mixed-signal unit 301.

The value of the delay introduced by the fractional delay process 306 is derived from estimates of the residual timing error calculated by the digital signal processing block 305. A timing error estimate is produced for each burst that is processed by block 305. These timing error estimates are passed to a low-pass filtering, or averaging, process 308 such that the accuracy of those estimates can be improved.

Improvements to the accuracy of the corrections being made by the fractional delay process 306 can be achieved by selecting the timing error estimates used by the low-pass filtering process 308. If noisy timing error estimates are excised and not used to calculate the value of the correction to be applied by the fractional delay process 306, the residual timing error at the input to the demodulation process 307 can be reduced. A number of different approaches can be used to select which timing errors should be excluded from the filtering process 308. For example, the digital signal processing block 305 could be configured to send the filtering process 308 a timing error only if the burst to which that error relates has been demodulated with less than a certain proportion of errors.

The timing error estimates are also used to correct the timing of the digital sample acquisition timing by the ADC unit 302. As is done with the timing corrections made in the digital signal processing section, the timing error estimates are first low-pass filtered in process 309 before being used to adjust the digital sample acquisition timing of the ADC unit 302.

Various approaches can be used by the digital signal processing block 305 to derive estimates of the residual timing error in the filtered signal emerging from process 306. For example, in some digital communications systems the transmitter embeds a sequence of known symbols in the block of information constituting a burst. This is the case in the E-GPRS system, where a sequence of 26 symbols collectively referred to as a training sequence and which is known to the receiver is inserted in the middle of each information burst. This training sequence can be used by the digital signal processing block 305 in a known manner to estimate how far the timing of the received burst is from the ideal value and thereby produce a timing error estimate for each burst.

The fractional delay filter can be implemented using either an Infinite Impulse. Response (IIR) or Finite Impulse Response (FIR) structure. Filtering techniques based in the frequency domain could also be used for the implementation.

The timing resolution of the delay introduced by the fractional delay process 306 allows complexity to be traded-off against performance. For a given timing correction, it is possible to calculate adaptively the required configuration for the fractional delay filter that needs to be implemented by process 306. Hence, the configuration of the fractional delay filter could be calculated for each new burst using a timing correction established on the basis of timing errors measured for earlier bursts. Such an approach should lead to good performance in terms reducing the residual timing error at the input to the demodulation process 307. However, the implementation of this solution could require the adaptive derivation of a new fractional delay filter for each burst received at the digital signal processing block 305 and hence could prove too complex. The implementation complexity of the fractional delay process 306 can be reduced if the resolution of the timing corrections that are to be applied is reduced. Reducing the resolution of the timing corrections that are to be applied by the fractional delay process 306 limits the number of possible corrections. If the number of possible correction values is low enough, it is possible to pre-calculate and store a configuration of the fractional delay filter for each of the possible correction values. In such a case, it is not necessary to calculate a new configuration for each incoming burst, rather the fractional delay process 306 only needs to engage the stored fractional delay filter configuration with the timing correction value that is closest to the desired one. One consequence of using such an approach is that even after the fractional delay correction, the timing of the received signal will not be perfect. Hence, this could slightly degrade the performance of the demodulation process. However, this performance degradation can be kept to a minimum by carefully selecting the timing correction resolution of the stored filter configurations.

FIG. 4 illustrates how the timing recovery loop of FIG. 3 can be adapted to cope with multi-slot reception in an E-GPRS receiver. FIG. 4 illustrates a processing scheme for the reception of two slots but it is possible to extend it to any desired number of slots. Elements 401 to 404 and 414 correspond, respectively, to elements 301 to 304 and 309 of FIG. 3 and their functions will not be described again in detail. Two versions 405 and 408 of digital signal processing block 305 are included, each for handling a respective one of the received slots. Each of blocks 405 and 408 includes a respective fractional delay process 406 and 409 for adjusting the sample timing in the manner of process 306 and a respective demodulation process 407 and 410 for producing estimates of the transmitted information bits from the respective slots. The fractional delay processes 406 and 409 implement delays that can be adapted on the basis of timing errors deduced by their respective digital signal processing blocks 405 and 408. The timing errors are filtered by respective averaging filters 411 and 412 prior to their use in adapting their respective fractional delay processes 406 and 409. It is important to note that the two signal processing blocks 405 and 408 do not necessarily correspond to two separate physical entities as they could be software processes running in time-shared fashion on a single processor or other hardware block which is time-shared between the different time slots hardware element. Although the slots that are to be demodulated by blocks 405 and 407 are not received contemporaneously, the processing performed by blocks 405 and 407 may overlap in time to some (greater or lesser) degree.

Each of digital signal processing blocks 405 and 408 provides an estimate of the residual timing error in its corresponding time slot. The separate timing errors from blocks 405 and 408 are then brought together in a combining process 413 (typically by averaging) to generate a single residual timing error. This combined timing error is then subjected to averaging over a number of bursts by filtering process 414 and the filtered result is used to adapt the digital sample acquisition timing that is used by ADC process 402. Thus, the adaptation of ADC sample acquisition timing is done according to the timing error values from all of the time slots involved in the multi-slot transmission. Hence, the timing of the mixed-signal processing unit 401 is updated such that the average timing error across the different time slots involved in the multi-slot transmission is driven to zero. However, the correct timing for each of these individual time slots individually is normally different from this average value. This is why the timing corrections made by the fractional delay unit 406 and 409 are derived from the timing error estimate from the time slot to which the correction will be applied. Hence, the correction values of the fractional delay processes 406 and 409 can differ from one another. This means that even though the decimation process 404 in the mixed signal processing unit 401 will generate samples with a fixed period, the distance in time between symbols corresponding to different time slots can be adjusted with a resolution which is only limited by the resolution of the corrections made by the fractional delay processes 406 and 409.

In a preferred implementation, three pre-calculated fractional delay filter configurations are stored. Those different configurations correspond to timing corrections of ¼, ½ and ¾ of the modulation symbol period. This means that each fractional delay process 406, 409 can use those configurations to make corrections with a resolution equal to ±⅛ of a modulation symbol. This time resolution provides a good trade-off between implementation complexity and demodulation performance. Timing corrections of integer values of the symbol duration can easily be made by simply changing the symbol position within the burst that denotes the start of the part of the burst that has to be demodulated.

As explained earlier, in the E-GPRS system, the transmitter formats information in slots of symbols. Eight such slots are then grouped together to form a TDMA frame with duration equal to 4.165 ms. Each slot is normally specified to correspond to 156¼ modulation symbols. However, two different options have been defined in the standard ('3GPP TS 45.010, Technical Specification 3rd Generation Partnership Project; Technical Specification Group GSM/EDGE Radio Access Network; Radio subsystem synchronisation') as to how basestations can group together the different slots in a single TDMA frame. Those different formats are illustrated in FIG. 5 for two types of base stations. It can be seen that in both cases, the number of modulation symbols in a TDMA frame is always equal to 1250. However, the number of symbols across two consecutive slots is not identical for the two formats. In one of the two formats, each slot is always 156¼ symbols long. In the other format, the length of consecutive slots alternates between 156 and 157 symbols. This means that the timing corrections to be made by the receiver will need to be different depending on which of these formats is used in a received transmission. The problem is exacerbated in that a receiver will not be informed of the timing format of the consecutive incoming bursts and hence the receiver will need to adapt to the selected format in a blind fashion. The scheme proposed in FIG. 4 achieves this goal by keeping the calculation of the timing corrections being made by the fractional delay processes 406 and 409 separate for the different slots involved in a multi-slot transmission. Consequently, the corrections made by the fractional delay processes 406 and 409 can be different for the different slots involved in a multi-slot transmission and will automatically match the transmission format.

The invention claimed is:

1. A telecommunications network participant, comprising an analog to digital converter arranged to digitise, as a series of samples, a received signal containing a succession of symbols, and a digital signal processor arranged to measure time misalignment between the symbols and the samples and arranged to apply a fractional delay to the positions of the samples to reduce the misalignment,
wherein the received signal has a format such that the symbols are arranged in bursts and the digital signal processor is arranged to deduce for each of one or more bursts a respective timing error and is arranged to apply a fractional delay to suppress the timing error or errors,
wherein the received signal has a format in which the bursts are grouped into a repeated time frame, the time frame containing a number of time slots, each time slot containing a burst and, for each of a plurality of said time slots, the digital signal processor is arranged to deduce a timing error for each of one or more bursts in the respective slot and to apply a fractional delay to suppress the timing error or errors of the respective slot, and
wherein for each of a plurality of said time slots, the digital signal processor is arranged to deduce a timing error for each of several bursts in the respective slot, to combine the errors to produce a resultant error for the respective slot and to apply a fractional delay to suppress the resultant error of the respective slot.

2. A telecommunications network participant according to claim 1, wherein the analog to digital converter is arranged to adjust the timing of the digitisation of the samples to suppress the misalignment.

3. A telecommunications network participant according to claim 1, wherein the digital signal processor is further arranged to shift the samples in time by one or more integer symbol positions to suppress the misalignment.

4. A telecommunications network participant according to claim 1, wherein the digital signal processor is further arranged to combine timing errors from different time slots to produce a sampling timing error and the analog to digital converter is arranged to adjust the timing of the digitisation of the samples to suppress the sampling timing error.

5. A telecommunications network participant according to claim 1, wherein the digital signal processor is arranged to deduce a timing error for a burst by calculating the position of a known training sequence in the burst and measuring the time offset between said position and an ideal position in the burst of said training sequence.

6. A telecommunications network participant, comprising an analog to digital converter arranged to digitise, as a series of samples, a received signal containing a succession of symbols, and a digital signal processor arranged to measure time misalignment between the symbols and the samples and arranged to apply a fractional delay to the positions of the samples to reduce the misalignment,
wherein the received signal has a format such that the symbols are arranged in bursts and the digital signal processor is arranged to deduce for each of one or more bursts a respective timing error and is arranged to apply a fractional delay to suppress the timing error or errors, wherein the received signal has a format in which the bursts are grouped into a repeated time frame, the time frame containing a number of time slots, each time slot containing a burst and, for each of a plurality of said time slots, the digital signal processor is arranged to deduce a timing error for each of one or more bursts in the respective slot and to apply a fractional delay to suppress the timing error or errors of the respective slot, wherein the digital signal processor is arranged to apply a desired fractional delay to samples by appropriately reconfiguring a fractional delay filter providing the delay, and wherein the digital signal processor has access to several pre-stored configurations of the filter and the digital signal processor is arranged to reconfigure the filter by selecting for the filter the configuration that most closely matches the desired fractional delay.

7. A method of digitising a received telecommunications signal, the method comprising digitising, as a series of samples, a received signal containing a succession of symbols, measuring time misalignment between the symbols and the samples and applying a fractional delay to the positions of the samples to reduce the misalignment, wherein the received signal has a format such that the symbols are arranged in bursts, the measuring step comprises deducing for each of one or more bursts a respective timing error and the delay applying step comprises applying a fractional delay to suppress the timing error or errors, wherein the received signal has a format in which the bursts are grouped into a repeated time frame, the time frame containing a number of time slots, each time slot containing a burst and, for each of a plurality of said time slots, the measuring step comprises deducing a timing error for each of one or more bursts in the respective slot and the delay applying step comprises applying a fractional delay to suppress the timing error or errors of the respective slot, and wherein, for each of a plurality of said time slots, the measuring step comprises deducing a timing error for each of several bursts in the respective slot and combining the errors to produce a resultant error for the respective slot and the delay applying step comprises applying a fractional delay to suppress the resultant error of the respective slot.

8. A method according to claim 7, wherein the digitising step is arranged to adjust the timing of the digitisation of the samples to suppress the misalignment.

9. A method according to claim 7, further comprising a translating step of shifting the samples in time by one or more integer symbol positions to suppress the misalignment.

10. A method according to claim 7, wherein the method further comprises combining timing errors from different time slots to produce a sampling timing error and the digitising step comprises adjusting the timing of the digitisation of the samples to suppress the sampling timing error.

11. A method according to claim 7, wherein the measuring step deduces a timing error for a burst by calculating the position of a known training sequence in the burst and measuring the time offset between said position and an ideal position in the burst of said training sequence.

12. A method of digitising a received telecommunications signal, the method comprising digitising, as a series of samples, a received signal containing a succession of symbols, measuring time misalignment between the symbols and the samples and applying a fractional delay to the positions of the samples to reduce the misalignment, wherein the received signal has a format such that the symbols are arranged in bursts, the measuring step comprises deducing for each of one or more bursts a respective timing error and the delay applying step comprises applying a fractional delay to suppress the timing error or errors, wherein the received signal has a format in which the bursts are grouped into a repeated time frame, the time frame containing a number of time slots, each time slot containing a burst and, for each of a plurality of said time slots, the measuring step comprises deducing a timing error for each of one or more bursts in the respective slot and the delay applying step comprises applying a fractional delay to suppress the timing error or errors of the respective slot, and wherein the delay applying step comprises applying a desired fractional delay to samples by appropriately reconfiguring a fractional delay filter providing the delay, wherein the delay applying step comprises reconfiguring the filter by selecting for the filter one of several pre-stored configurations of the filter that most closely matches the desired fractional delay.

* * * * *